United States Patent
Saito et al.

(10) Patent No.: US 10,899,916 B2
(45) Date of Patent: Jan. 26, 2021

(54) POLYACETAL RESIN COMPOSITION AND SLIDING MEMBER

(71) Applicant: OILES CORPORATION, Tokyo (JP)

(72) Inventors: Aoi Saito, Fujisawa (JP); Kingo Miyasaka, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 16/347,230

(22) PCT Filed: Dec. 21, 2017

(86) PCT No.: PCT/JP2017/046049
§ 371 (c)(1),
(2) Date: May 3, 2019

(87) PCT Pub. No.: WO2018/123834
PCT Pub. Date: Jul. 5, 2018

(65) Prior Publication Data
US 2019/0256699 A1  Aug. 22, 2019

(30) Foreign Application Priority Data
Dec. 27, 2016 (JP) ................................. 2016-253599

(51) Int. Cl.
| | | |
|---|---|---|
| *C08L 23/08* | (2006.01) | |
| *C08L 23/16* | (2006.01) | |
| *C08L 59/00* | (2006.01) | |
| *F16C 33/20* | (2006.01) | |
| *C08L 29/00* | (2006.01) | |
| *C08L 31/04* | (2006.01) | |
| *C08L 29/04* | (2006.01) | |
| *C08L 91/00* | (2006.01) | |
| *C08L 23/00* | (2006.01) | |
| *C10M 171/00* | (2006.01) | |

(52) U.S. Cl.
CPC .......... *C08L 23/0861* (2013.01); *C08L 23/00* (2013.01); *C08L 23/08* (2013.01); *C08L 23/16* (2013.01); *C08L 29/00* (2013.01); *C08L 29/04* (2013.01); *C08L 31/04* (2013.01); *C08L 59/00* (2013.01); *C08L 91/00* (2013.01); *F16C 33/20* (2013.01); *F16C 33/201* (2013.01); *C10M 171/00* (2013.01)

(58) Field of Classification Search
CPC .......... C08L 59/00; C08L 59/02; C08L 59/04; C08L 23/0861
See application file for complete search history.

(56) References Cited

U.S. PATENT DOCUMENTS

| | | | |
|---|---|---|---|
| 4,766,168 A | | 8/1988 | West |
| 5,679,743 A | | 10/1997 | Hirai et al. |

FOREIGN PATENT DOCUMENTS

| | | | |
|---|---|---|---|
| CN | 103881276 A | * | 6/2014 |
| EP | 421973 | * | 4/1991 |
| JP | 43-22669 | | 9/1968 |
| JP | 46-42217 | | 12/1971 |
| JP | 47-29374 | | 8/1972 |
| JP | 62-288649 | | 12/1987 |
| JP | 63-65232 | | 12/1988 |
| JP | 6-287405 | | 10/1994 |
| JP | 6-287406 | | 10/1994 |
| JP | 2002-105279 | | 4/2002 |
| JP | 2010-270203 | | 12/2010 |

OTHER PUBLICATIONS

EP 421973 machine translation (Apr. 1991).*
CN 103881276 A machine translation (Jun. 2014).*
International Search Report for PCT/JP2017/046049 dated Feb. 20, 2018, 2 pages.

* cited by examiner

*Primary Examiner* — Ana L. Woodward
(74) *Attorney, Agent, or Firm* — Nixon & Vanderhye P.C.

(57) ABSTRACT

A polyacetal resin composition includes: in addition to a polyacetal resin as a principal component, 1.5 to 7% by mass of an ethylene-propylene-diene rubber; 0.5 to 3% by mass of a saponified ethylene-vinyl acetate copolymer; and 0.05 to 0.3% by mass of an ethylene-α-olefin copolymer.

5 Claims, No Drawings

POLYACETAL RESIN COMPOSITION AND SLIDING MEMBER

This application is the U.S. national phase of International Application No. PCT/JP2017/046049 filed Dec. 21, 2017 which designated the U.S. and claims priority to Japanese Patent Application No. 2016-253599 filed Dec. 27, 2016, the entire contents of each of which are hereby incorporated by reference.

TECHNICAL FIELD

The present invention relates to a polyacetal resin composition and a sliding member such as a bearing composed of the polyacetal resin composition.

BACKGROUND ART

Polyacetal resins have excellent mechanical properties, excel in sliding characteristics such as friction and wear, heat resistance, chemical resistance, and electrical properties, and are used as engineering plastics in the form of sliding members in extensive fields such as automotive parts, electronic and electric parts, and general industrial machinery parts.

PRIOR ART DOCUMENTS

Patent Documents

[Patent Document 1] JP-B-1971-42217
[Patent Document 2] JP-B-1972-29374
[Patent Document 3] JP-B-1988-65232
[Patent Document 4] JP-A-2002-105279
[Patent Document 5] JP-A-1994-287406

SUMMARY OF THE INVENTION

Problems that the Invention is to Solve

Incidentally, a sliding member composed of a polyacetal resin alone has excellent self-lubricity and wear resistance but has drawbacks in that it has a slightly high coefficient of friction, causes stick-slip due to the fluctuation of its coefficient of friction during sliding, and generates an unpleasant sliding frictional sound (creaking sound) attributable to that stick-slip.

In view of such drawbacks, proposals have been made in Patent Documents 1, 2, 3, and 4 regarding sliding members or resin compositions for sliding members in which a lubricant such as a lubricating oil or a wax, or a synthetic resin having low friction properties such as a polyethylene resin is compounded with a polyacetal resin.

However, with the sliding member obtained by the manufacturing process described in Patent Document 1, it is possible to remarkably improve sliding characteristics such as friction and wear, but stick-slip can occur in cases where a synthetic resin is selected as a mating sliding member for the purpose of making the aforementioned part compact and lightweight, and sliding friction between the synthetic resins has occurred, and it is not sufficiently possible to prevent generation of the creaking sound attributable to that stick-slip. Moreover, there is a problem that satisfactory molded articles are difficult to obtain by ordinary molding conditions because molding conditions for obtaining molded articles in which respective components are uniformly mixed are complicated, and because temperature control of various parts of a molding machine is required during molding. With the sliding members comprising synthetic resin compositions described in Patent Document 2 to Patent Document 4, it is possible to improve the sliding characteristics such as friction and wear to some extent, but since the polyolefin resin is poor in compatibility with the polyacetal resin, the sliding characteristics at the time when the sliding members containing them are used under a high load (high surface pressure) condition are not sufficient, and in terms of moldability as well there is a risk of exfoliation occurring on the surface of the molded article.

In view of the above-described circumstances, the present applicant proposed a polyacetal resin composition (Patent Document 5) which remarkably improved the sliding characteristics such as friction and wear without causing a decline in mechanical properties, prevented generation of a sliding frictional sound (creaking sound), and excelled in molding workability in such as injection molding in terms of ordinary molding conditions without causing such as separation and exudation of the components, and a sliding member composed of that composition. However, still lower frictional properties and improvement of wear resistance for the sliding member have been inevitable in conjunction with the tendency toward higher performance of parts in various fields.

The present invention has been devised in view of the above-described aspects, and its object is to provide a polyacetal resin composition and a sliding member, wherein while the advantages of the molding workability of the polyacetal resin composition described in Patent Document 5 are retained as they are, in the case of the sliding member composed of that resin composition, a creaking sound is not generated, and load carrying capacity and sliding characteristics including low frictional properties and wear resistance can be substantially improved.

Means for Solving the Problems

A polyacetal resin composition in accordance with the present invention comprises: in addition to a polyacetal resin as a principal component, 1.5 to 7% by mass of an ethylene-propylene-diene rubber; 0.5 to 3% by mass of a saponified ethylene-vinyl acetate copolymer; and 0.05 to 0.3% by mass of an ethylene-α-olefin copolymer.

As for the polyacetal resin composition of the present invention which serves as a molding material for a sliding member or the like, the biting property against the screw of the molding machine is good, the molding workability is excellent, exfoliation does not occur on the surface of the molded product such as the sliding member, and it is possible to obtain a molded product having an excellent surface condition. According to a sliding member composed of the polyacetal resin composition of the present invention, even in cases where a synthetic resin-made mating member is selected as the sliding mating member, stick-slip does not occur, the generation of a creaking sound ascribable to the stick-slip is prevented as practically as possible, and it is possible to substantially improve load carrying capacity and the sliding characteristics including low frictional properties and wear resistance.

The polyacetal resin composition in accordance with the present invention may further comprise, as an additional component, 0.1 to 10% by mass of a lubricant which exhibit a liquid state at normal temperature or exhibit a liquid state when heated during molding.

Even a polyacetal resin composition containing a lubricant as an additional component can be molded without causing a malfunction such as slippage with the screw of a molding machine and has an excellent surface condition without exfoliation on the surface of the obtained molded product. In the case of a sliding member composed of a polyacetal resin composition containing a lubricant, since the lubricant is contained in the molded product (sliding member), it is possible to further improve especially sliding characteristics including low frictional properties and wear resistance.

Advantages of the Invention

According to the present invention, it is possible to provide a polyacetal resin composition and a sliding member which do not generate a creaking sound and are capable of substantially improving load carrying capacity and sliding characteristics including low frictional properties and wear resistance.

MODE FOR CARRYING OUT THE INVENTION

A description will be given of a mode for carrying out the invention and examples with respect to a polyacetal resin composition in accordance with the present invention which comprises: in addition to a polyacetal resin as a principal component, 1.5 to 7% by mass of an ethylene-propylene-diene rubber; 0.5 to 3% by mass of a saponified ethylene-vinyl acetate copolymer; and 0.05 to 0.3% by mass of an ethylene-α-olefin copolymer, as well as a sliding member in accordance with the present invention which comprises this polyacetal resin composition. It should be noted that the present invention is not limited to this mode of carrying out the invention and examples.

The polyacetal resin which constitutes a principal component is a polymer compound having an oxymethylene group ($-CH_2O-$) as a main constituent unit, and the polyacetal resin includes a polyacetal homopolymer consisting of the oxymethylene unit alone and a polyacetal copolymer containing an oxymethylene unit and a comonomer unit. In the present invention, it is possible to use any of a polyacetal homopolymer and a polyacetal copolymer, but in view of thermal stability the polyacetal copolymer is preferable.

Insofar as the polyacetal resin is moldable, the molecular weight (number average molecular weight) of the polyacetal resin is not particularly limited but is in the range of 20,000 to 80,000. Furthermore, the polyacetal resin should preferably be such that the melt flow rate (MFR) in accordance with ASTM-D-1238 method is measurable, and that the MFR measured under the conditions of a temperature of 190° C. and a measuring load of 2160 g is in the range of 0.1 to 100 g/10 min, particularly preferably in the range of 1.0 to 15.0 g/10 min.

As specific examples of the polyacetal resin, it is possible to cite a polyacetal homopolymer with a molecular weight of 50,000 to 70,000 (e.g., "Delrin (tradename)" manufactured by DuPont USA, "TENAC (tradename)" manufactured by Asahi Kasei Corp., and a polyacetal copolymer with a molecular weight of 50,000 (e.g., "DURACON (tradename)" manufactured by Polyplastics Co., Ltd.).

As for the ethylene-propylene-diene rubber (EPDM) which is compounded with the polyacetal resin constituting a principal component, it is possible to use any of various copolymers obtained by copolymerizing ethylene, propylene, and diene. As a diene-based monomer contained in the ethylene-propylene-diene rubber, a diene-based monomer with a carbon number of 5 to 20 is preferable. Specifically, it is possible to cite 1,4-pentadiene, 1,4-hexadiene, 1,5-hexadiene, 2,5-dimethyl-1,5-hexadiene, 1,4-octadiene, 1,4-cyclohexadiene, cyclooctadiene, dicyclopentadiene (DCP), 5-ethylidene-2-norbornene (ENB), 5-butylidene-2-norbornene, 2-methallyl-5-norbornene, 2-isopropenyl-5-norbornene, and the like. Among these diene-based monomers, dicyclopentadiene (DCP), 5-ethylidene-2-norbornene (ENB), and 1,4-hexadiene are preferable. In particular, ethylene-propylene-diene rubbers are preferable which have an ethylene content of 45 to 80% by mass and whose diene components are 5-ethylidene-2-norbornene, dicyclopentadiene, or 1,4-hexadiene.

In view of heat resistance, the amount of diene of the ethylene-propylene-diene rubber is preferably 1.5 to 5% by mass, particularly preferably 2 to 5% by mass. Of the ethylene-propylene-diene rubbers, as a high-ethylene-propylene-diene rubber whose ethylene content exceeds 55% by mass, a non-oil-extended ethylene-propylene-diene rubber which is not extended by an extender oil is preferable. As such a non-oil-extended high-ethylene EPDM, it is possible to cite by way of example those manufactured by Sumitomo Chemical Co., Ltd., including Esprene 502 (ethylene content: 56% by mass, diene content: 4.0% by mass), Esprene 301 (ethylene content: 62% by mass, diene content: 3.0% by mass), Esprene 512F (ethylene content: 65% by mass, diene content: 4.0% by mass) (all tradenames); and Mitsui EPT3092PM (ethylene content: 65% by mass, diene content: 4.6% by mass) (tradename) manufactured by Mitsui Chemicals, Inc.

The compounding amount of the ethylene-propylene-diene rubber in the polyacetal resin composition is 1.5 to 7% by mass, preferably 3 to 7% by mass. If the compounding amount is less than 1.5% by mass, the improvement of load carrying capacity and sliding characteristics including low frictional properties and wear resistance can hardly be expected concerning the sliding member comprising the polyacetal resin composition, and no sufficient effect can be noted in the prevention of occurrence of creaking sound. Meanwhile, even if compounding is effected with a compounding amount exceeding 7% by mass, any further improvement of the sliding characteristics of the sliding member is not noted.

In the saponified ethylene-vinyl acetate copolymer which is compounded with the polyacetal resin constituting the principal component, vinyl acetate of the ethylene-vinyl acetate copolymer has been saponified, and the saponified ethylene-vinyl acetate copolymer is preferably one in which an ethylene-vinyl acetate copolymer with a vinyl acetate content before saponification of 15 to 50% by mass, preferably 18 to 45% by mass has been saponified to a saponification degree of 50 to 100%.

In the case where the saponified ethylene-vinyl acetate copolymer with a saponification degree of 50 to 100% by mass is used, the molded product composed of the polyacetal resin composition substantially improves the load carrying capacity and sliding characteristics including low frictional properties and wear resistance without causing a decline in mechanical strength.

The melt flow rate (MFR) (190° C., under a load of 2160 g) of the saponified ethylene-vinyl acetate copolymer which has been saponified to a saponification degree of 50 to 100% is preferably 0.3 to 200 g/10 min, and more preferably 0.5 to 150 g/10 min. If the melt flow rate is less than the aforementioned value, viscosity becomes excessively high and there are cases where melt extrusion becomes difficult, whereas if the melt flow rate exceeds the aforementioned value, there are cases where moldability becomes unstable.

This saponified ethylene-vinyl acetate copolymer can be manufactured by subjecting an ethylene-vinyl acetate copolymer manufactured by a manufacturing method such as a high-pressure method and an emulsion polymerization method to saponification by treating with a system composed of a low-boiling alcohol such as methanol or ethanol and an alkali such as sodium hydroxide (caustic soda), potassium hydroxide, or sodium methylate. As specific examples of the saponified ethylene-vinyl acetate copolymer, it is possible to cite by way of example those manufactured by Tosoh Corp., including "Melthene H-6410M" (with a vinyl acetate content before saponification of 28% by mass, a saponification degree of 40%, and an MFR of 16 g/10 min), "Melthene H-6051" (with a vinyl acetate content before saponification of 28% by mass, a saponification degree of 100%, and an MFR of 5.5 g/10 min), and "Melthene H-6820" (with a vinyl acetate content before saponification of 28% by mass, a saponification degree of 80%, and an MFR of 115 g/10 min) (all tradenames); and those manufactured by Taoka Chemical Co., Ltd., including TECHNOLINK R-400 (with a vinyl acetate content before saponification of 41% by mass, a saponification degree of 50%, and an MFR of 40 g/10 min), TECHNOLINK K431 (with a vinyl acetate content before saponification of 28% by mass, a saponification degree of 60%, and an MFR of 5 g/10 min), and TECHNOLINK R-100 (with a vinyl acetate content before saponification of 41% by mass, a saponification degree of 90%, and an MFR of 30 g/10 min) (all tradenames). It should be noted that in the case where reference is made to a saponification degree of 50 to 100% in this invention, cases are also included where a saponification degree of 50 to 100% has apparently been reached by mixing a saponified product of a high saponification degree and a saponified product of a low saponification degree.

The saponified ethylene-vinyl acetate copolymer which has been saponified to a saponification degree of 50 to 100% is contained finely dispersedly in the polyacetal resin, thereby substantially improving the load carrying capacity of the sliding member, preventing as practically as possible the generation of creaking sound, and substantially improving the sliding characteristics including low frictional properties and wear resistance.

The compounding amount of the saponified ethylene-vinyl acetate copolymer is 0.5 to 3% by mass, preferably 1.4 to 3% by mass. The saponified ethylene-vinyl acetate copolymer, when compounded at a ratio of 0.5% by mass, begins to exhibit an effect in the improvement of the sliding characteristics including low frictional properties and wear resistance, and the saponified ethylene-vinyl acetate copolymer, when compounded at a ratio of 1.4 to 3% by mass, exhibits a remarkable effect in the improvement of the sliding characteristics. However, if the saponified ethylene-vinyl acetate copolymer is compounded in excess of 3% by mass, there is a possibility of impairing load carrying capacity, and any further improvement of the sliding characteristics is not noted.

As for an ethylene-α-olefin copolymer, it is possible to cite a copolymer of ethylene and one or more kinds of α-olefin with a carbon number of 3 to 12. As the α-olefin with a carbon number of 3 to 12, it is possible to cite, for example, propylene (C3), 1-butene (C4), 1-pentene (C5), 4-methylpentene-1 (C6), 1-hexene (C6), 1-octene (C8), 1-decene (C10), and the like. Among these, it is more preferable to use 1-butene and 1-hexene.

As the ethylene-α-olefin copolymer, it is possible to cite an ethylene-propylene copolymer, an ethylene-1-butene copolymer, an ethylene-4-methylpentene-1copolymer, an ethylene-1-hexene copolymer, an ethylene-1-octene copolymer, an ethylene-propylene-1-butene copolymer, and the like. Among these, it is preferable to use the ethylene-1-butene copolymer and the ethylene-1-hexene copolymer.

The density of the ethylene-α-olefin copolymer is 860 to 930 kg/m$^3$, preferably 900 to 930 kg/m$^3$, and more preferably 910 to 930 kg/m$^3$. The melt flow rate (MFR) is 0.5 to 100 g/10 min, preferably 2 to 50 g/10 min, and more preferably 5 to 30 g/10 min.

As specific examples of the ethylene-1-butene copolymer, it is possible to cite, among others, those manufactured by Sumitomo Chemical Co., Ltd., including SUMIKATHENE LGA 701 (density of 920 kg/m$^3$, MFR of 8 g/10 min), SUMIKATHENE LGA 801 (density of 920 kg/m$^3$, MFR of 20 g/10 min), and SUMIKATHENE LGA 802 (density of 935 kg/m$^3$, MFR of 20 g/10 min) (all tradenames); those manufactured by Prime Polymer Co., Ltd., including NEO-ZEX 20201J (density of 918 kg/m$^3$, MFR of 19 g/10 min) and NEO-ZEX 45200 (density of 943 kg/m$^3$, MFR of 20 g/10 min) (both trademarks); and NIPOLON-L M55 (tradename) manufactured by Tosoh Corp., (density of 920 kg/m$^3$, MFR of 8 g/10 min). As specific examples of the ethylene-1-hexene copolymer, it is possible to cite, among others, those manufactured by Prime Polymer Co., Ltd., including ULTZEX 15150J (density of 914 kg/m$^3$, MFR of 15 g/10 min), ULTZEX 20100J (density of 916 kg/m$^3$, MFR of 8.5 g/10 min), ULTZEX 20200J (density of 918 kg/m$^3$, MFR of 18.5 g/10 min), and ULTZEX 25100J (density of 924 kg/m$^3$, MFR of 10 g/10 min) (all tradenames); and those manufactured by Sumitomo Chemical Co., Ltd., including SUMIKATHENE αGZ 801 (density of 920 kg/m$^3$, MFR of 20 g/10 min) and SUMIKATHENE αGZ 802 (density of 927 kg/m$^3$, MFR of 30 g/10 min) (both tradenames).

The compounding amount of the ethylene-α-olefin copolymer is 0.05 to 0.3% by mass, preferably 0.1 to 0.3% by mass. If the compounding amount is less than 0.05% by mass, an effect is not sufficiently demonstrated particularly in the reduction of low frictional properties, whereas if compounding is effected with a compounding amount exceeding 0.3% by mass, any further improvement of the sliding characteristics is not noted.

The polyacetal resin composition in accordance with the present invention may comprise, as an additional component, a lubricant which exhibit a liquid state at normal temperature or exhibit a liquid state when heated during molding.

As the lubricant which exhibit a liquid state at normal temperature, it is possible to cite paraffinic and naphthenic mineral oils including spindle oil, refrigerator oil, dynamo oil, turbine oil, machine oil, cylinder oil, and gear oil; an animal oil such as whale oil; vegetable oils such as castor oil and jojoba oil; and synthetic oils including ester, polyglycol, polyphenyl ether, silicone, and halocarbon.

As the lubricant which exhibit a liquid state when heated during molding, it is possible to cite waxy substances including natural waxes such as montan wax and carnauba wax, hydrocarbon-based wax, higher fatty acid, and a wax derived from a higher fatty acid.

As the hydrocarbon-based wax, it is possible to cite a paraffinic wax generally having a carbon number of 24 or more, an olefinic wax generally having a carbon number of 26 or more, alkylbenzene generally having a carbon number of 28 or more, and a microcrystalline wax.

As the higher fatty acid, it is possible to cite, among others, a higher saturated fatty acid including lauric acid, myristic acid, palmitic acid, stearic acid, arachidic acid, behenic acid, cerotic acid, and montanic acid generally having a carbon number of 12 or more; and an unsaturated fatty acid including oleic acid, linoleic acid, linolenic acid, elaidic acid, octadecenoic acid, arachidonic acid, gadoleic acid, erucic acid, and parinaric acid generally having a carbon number of 18 or more.

As the wax which is derived from a higher fatty acid, it is possible to cite a higher fatty acid ester, a higher fatty acid amide, a higher fatty acid salt, and the like.

The higher fatty acid ester is an ester of the aforementioned higher fatty acid with a monohydric or polyhydric alcohol. As the monohydric alcohol, it is possible to cite capryl alcohol, lauryl alcohol, myristyl alcohol, palmityl alcohol, stearyl alcohol, behenyl alcohol, and the like. As the polyhydric alcohol, it is possible to cite ethylene glycol, propylene glycol, butane diole, glycerin, pentaerythritol, sorbitol, and the like.

As the higher fatty acid ester, it is possible to cite stearyl stearate, pentaerythritol tetrastearate, stearic acid monoglyceride, behenic acid monoglyceride, montanoic acid wax, and the like.

As the higher fatty acid amide, it is possible to cite a saturated higher fatty acid amide including lauric acid amide, palmitic acid amide, stearic acid amide, and behenic acid amide; an unsaturated higher fatty acid amide including erucic acid amide, oleic acid amide, brassidic acid amide, and elaidic acid amide; and a higher fatty acid bisamide including methylene-bis-stearic acid amide, ethylene-bis-stearic acid amide, and ethylene-bis-oleic acid amide (including a saturated or unsaturated higher fatty acid alkyl amide such as a higher fatty acid methyl amide and a higher fatty acid ethyl amide).

The higher fatty acid salt (metallic soap) is a salt of the aforementioned higher fatty acid with an alkali metal such as lithium, sodium, and potassium or an alkaline earth metal such as magnesium, calcium, and barium. As the higher fatty acid salt, it is possible to cite lithium stearate, calcium stearate, zinc stearate, magnesium stearate, and the like.

As for these lubricants, one kind may be used, or two or more kinds may be used in combination. In a case where a lubricant which exhibit a liquid state when heated during molding and a lubricant which exhibit a liquid state at normal temperature are jointly used, the lubricant which exhibit a liquid state when heated during molding plays the role of a retainer which absorbs and retains the lubricant which exhibit a liquid state at normal temperature, so that it is possible to increase the compounding amount of the lubricant, thereby making it possible to further improve the sliding characteristics of the sliding member.

The compounding amount of the lubricant is 0.1 to 10% by mass, preferably 0.5 to 5% by mass. If the compounding amount of the lubricant is less than 0.1% by mass, there is no effect in the improvement of the sliding characteristics, whereas if the compounding amount exceeds 10% by mass, there are possibilities of a decline in the mechanical properties of the sliding member obtained by molding, degradation of the surface appearance, faulty biting onto the screw, and the like.

Insofar as the object of the invention is not impaired, the following may be added to the polyacetal resin composition of the invention, as necessary: solid lubricants such as molybdenum disulfide, graphite, and polytetrafluoroethylene; fibrous materials such as glass fibers, carbon fibers, aramid fibers, and potassium titanate fibers and whiskers; and inorganic fillers such as glass powder, talc, clay, calcium carbonate, and zinc oxide. In addition, known various stabilizers may be added to reinforce stability. Further, known additives may be compounded to improve the properties in correspondence with the intended use. As the additives, it is possible to cite various coloring agents, mold releasing agents (other than the aforementioned lubricants), antistatic agents, surfactant, and the like.

The polyacetal resin composition in accordance with the present invention is easily prepared by a known method which is generally practiced as a conventional preparation method of a resin composition. For example, it is possible to cite, among others, a method in which prescribed amounts of a polyacetal resin, an ethylene-propylene-diene rubber, a saponified ethylene-vinyl acetate copolymer, and an ethylene-α-olefin copolymer are measured, and these components are mixed by a mixer such as a Henschel mixer, a super mixer, a ball mill, and a tumbler mixer to prepare a mixture, which mixture is charged into a single- or twin-screw type extruder and is melt-kneaded, to thereby form string-like molded products, which are then cut to fabricate pellets, these pellets being used as the polyacetal resin composition; or a method in which prescribed amounts of an ethylene-propylene-diene rubber, a saponified ethylene-vinyl acetate copolymer, and an ethylene-α-olefin copolymer are measured, and these components are mixed by a mixer similar to the above-described one to prepare a mixture, which mixture is charged into the single- or twin-screw type extruder, is melt-kneaded, and is formed into string-like molded products, which are then cut to fabricate pellets, these pellets being compounded with the polyacetal resin at a ratio of predetermined amounts so as to obtain the polyacetal resin composition.

As for the polyacetal resin composition accordance with the present invention, molding workability such as the biting property against the screw of the molding machine is excellent, and the sliding member formed by molding that polyacetal resin composition is easily manufactured by a conventional injection molding machine or extrusion molding machine. As for the sliding member in accordance with the present invention, the load carrying capacity is substantially improved without impairing the intrinsic mechanical properties of the polyacetal resin, the generation of a creaking sound is prevented in the sliding friction with a mating material, and it is possible to substantially improve the sliding characteristics including lower frictional properties and wear resistance.

EXAMPLES

In these examples, the evaluation of load carrying capacity, creaking sound, and sliding characteristics of a sliding member composed of a polyacetal resin composition was conducted by the following evaluation method.

<Evaluation Method of Load Carrying Capacity, Sliding Frictional Sound (Creaking Sound), and Sliding Characteristics>

By using a Suzuki-type friction and wear testing machine (cylindrical end face contact thrust type), from a state in which sliding is started under the conditions of a load (surface pressure) of 10 $kgf/cm^2$ and a sliding velocity of 1 m/min, a load of 2 $kgf/cm^2$ is cumulatively applied for every 4 minutes until a load of 30 $kgf/cm^2$ is reached, a load of 5 $kgf/cm^2$ is cumulatively applied for every 5 minutes after the load of 30 $kgf/cm^2$ has been reached, and the load at the time when a creaking sound has occurred is measured, and one load short of that load is set as a limit load. Therefore, this limit load shows that the greater the numerical value of load, the more it excels in load carrying capacity and the creaking sound is not generated. The coefficient of friction shows the coefficient of friction at the time of the limit load, and the amount of wear shows the amount of dimensional change before and after the test. Dimensions and materials of the test specimen and the mating member and testing method are shown in Table 1.

TABLE 1

| | |
|---|---|
| Test specimen | Cylindrical sliding member (inside diameter of 20 mm, outside diameter of 25.6 mm, and length of 15 mm) composed of the polyacetal resin composition of the invention |
| Mating member | Cylindrical mating member (inside diameter of 20 mm, outside diameter of 25.6 mm, and length of 15 mm) composed of a polyacetal resin composition ("DURACON M90 (tradename)" manufactured by Polyplastics Co., Ltd.) |
| Lubrication | No lubrication |
| Testing method | A cylindrical mating member is fixed to the testing machine, an annular end face of a cylindrical sliding member as a test specimen is brought into contact with the annular end face of the mating member, and the sliding member is subjected to rotational sliding at the aforementioned sliding velocity. |

The following raw materials were prepared in these Examples and Comparative Examples.
(1) Polyacetal resin (POM)
As the polyacetal resin, a polyacetal copolymer ("DURACON M90 (tradename)" manufactured by Polyplastics Co., Ltd.) containing an oxymethylene unit and a comonomer unit and having a molecular weight of 50,000.
(2) Ethylene-propylene-diene rubber (EPDM)
An ethylene-propylene-diene rubber ("Mitsui EPT3092PM (tradename)" manufactured by Mitsui Chemicals, Inc.) with an ethylene content of 65% by mass and having dicyclopentadiene (DCP) as a diene component (diene content of 4.6% by mass).
(3) Saponified ethylene vinyl-acetate copolymer (saponified EVA)
(3-1) Saponified ethylene-vinyl acetate copolymer ("Melthene H-6410M (tradename)" manufactured by Tosoh Corp.) with a vinyl acetate content before saponification of 28% by mass, a saponification degree of 40%, and an MFR of 16 g/10 min
(3-2) Saponified ethylene-vinyl acetate copolymer ("TECHNOLINK R-400 (tradename)" manufactured by Taoka Chemical Co., Ltd.) with a vinyl acetate content before saponification of 41% by mass, a saponification degree of 50%, and an MFR of 40 g/10 min
(3-3) Saponified ethylene-vinyl acetate copolymer ("TECHNOLINK K431 (tradename)" manufactured by Taoka Chemical Co., Ltd.) with a vinyl acetate content before saponification of 28% by mass, a saponification degree of 60%, and an MFR of 5 g/10 min
(3-4) Saponified ethylene-vinyl acetate copolymer ("Melthene H-6820 (tradename)" manufactured by Tosoh Corp.) with a vinyl acetate content before saponification of 28% by mass, a saponification degree of 80%, and an MFR of 115 g/10 min
(3-5) Saponified ethylene-vinyl acetate copolymer ("Melthene H-6051 (tradename)" manufactured by Tosoh Corp.) with a vinyl acetate content before saponification of 28% by mass, a saponification degree of 100%, and an MFR of 5.5 g/10 min
(4) Ethylene-α-olefin copolymers (LLDPE)
(4-1) Ethylene-1-butene copolymer ("NIPOLON-L M55 (tradename)" (C4) manufactured by Tosoh Corp.) with a density of 920 kg/m³ and an MFR of 8 g/10 min
(4-2) Ethylene-1-hexene copolymer ("ULTZEX 20100J (tradename)" (C6) manufactured by Prime Polymer Co., Ltd.) with a density of 916 kg/m³ and an MFR of 8.5 g/10 min
(5) Lubricants
(5-1) Paraffin oil ("MORESCO WHITE P-350P (tradename)" manufactured by MORESCO Corp.)
(5-2) Hydrocarbon-based synthetic oil (ethylene-α-olefin oligomer) ("LUCANT (tradename)" manufactured by Mitsui Chemicals, Inc.)
(6) Ethylene-vinyl acetate copolymer (EVA)
Ethylene-vinyl acetate copolymer ("EVAFLEX EV260 (tradename)" manufactured by Du Pont-Mitsui Polychemicals Co., Ltd.) with a vinyl acetate content of 28% by mass Example 1 to Example 15

Components shown in Tables 2 to 4 were measured at quantitative ratios shown in Tables 2 to 4 and were mixed by a tumbler mixer to prepare a mixture, and the mixture was supplied to a twin-screw vented extruder and melt-kneaded to form string-like molded products, which were then cut to fabricate pellets serving as a molding material. Subsequently, these pellets were supplied to a screw type injection molding machine and were subjected to injection molding, to thereby fabricate cylindrical molded products (sliding members) having an inside diameter of 20 mm, an outside diameter of 25.6 mm, and a length of 15 mm With respect to these cylindrical molded products, the generation of creaking sound, surface pressure, load carrying capacity, the coefficient of friction, and the amount of wear were evaluated on the basis of the above-described evaluation method. The results are shown in Table 2 to Table 4.

Example 16

Measurement was made of 68.0% by mass of ethylene-propylene-diene rubber (2), 14.5% by mass of a saponified ethylene-vinyl acetate copolymer (3-1) and 14.5% by mass of a saponified ethylene-vinyl acetate copolymer (3-5) (apparent degree of saponification: 70%), and 3% by mass of an ethylene-α-olefin copolymer (4-2). These components were mixed by the tumbler mixer to prepare a mixture, and the mixture was supplied to the twin-screw vented extruder and melt-kneaded, to thereby form string-like molded products, which were then cut to fabricate pellets. 7 parts by mass of these pellets were compounded with 100 parts by mass of the polyacetal resin (1) and were mixed by the tumbler mixer to prepare a mixture. This mixture was supplied to the twin-screw vented extruder and melt-kneaded, to thereby form string-like molded products, which were then cut to fabricate pellets [93.5% by mass of polyacetal resin (1), 4.4% by mass of ethylene-propylene-diene rubber (2), 0.95% by mass of a saponified ethylene-vinyl acetate copolymer (3-1), 0.95% by mass of a saponified ethylene-vinyl acetate copolymer (3-5), and 0.2% by mass of an ethylene-α-olefin copolymer (4-2)]. Subsequently, these pellets were supplied to the screw type injection molding machine and were subjected to injection molding, to thereby fabricate cylindrical molded products (sliding members) having an inside diameter of 20 mm, an outside diameter of 25.6 mm, and a length of 15 mm.

Example 17

Pellets were fabricated by the component composition and method similar to those of Example 16. 7 parts by mass of these pellets and 1 part by mass of a lubricant (5-1) were compounded with 100 parts by mass of the polyacetal resin (1) and were mixed by the tumbler mixer to prepare a mixture. This mixture was supplied to the twin-screw vented extruder and melt-kneaded, to thereby form string-like molded products, which were then cut to fabricate pellets [92.6% by mass of polyacetal resin (1), 4.4% by mass of ethylene-propylene-diene rubber (2), 0.95% by mass of a saponified ethylene-vinyl acetate copolymer (3-1), 0.95% by mass of a saponified ethylene-vinyl acetate copolymer (3-5), 0.2% by mass of an ethylene-α-olefin copolymer (4-2), and 0.9% by mass of a lubricant (paraffin oil) (5-1)]. Subsequently, these pellets were supplied to the screw type injection molding machine and were subjected to injection molding, to thereby fabricate cylindrical molded products (sliding members) having an inside diameter of 20 mm, an outside diameter of 25.6 mm, and a length of 15 mm.

Example 18

Measurement was made of 68.0% by mass of ethylene-propylene-diene rubber (2), 14.5% by mass of a saponified ethylene-vinyl acetate copolymer (3-1) and 14.5% by mass of a saponified ethylene-vinyl acetate copolymer (3-5) (apparent degree of saponification: 70%), and 3.0% by mass of an ethylene-α-olefin copolymer (4-2). These components were mixed by the tumbler mixer to prepare a mixture, and the mixture was supplied to the twin-screw vented extruder and melt-kneaded, to thereby form string-like molded products, which were then cut to fabricate pellets. 10 parts by mass of these pellets were compounded with 100 parts by mass of the polyacetal resin (1) and were mixed by the tumbler mixer to prepare a mixture. This mixture was supplied to the twin-screw vented extruder and melt-kneaded, to thereby form string-like molded products, which were then cut to fabricate pellets [90.9% by mass of polyacetal resin (1), 6.2% by mass of ethylene-propylene-diene rubber (2), 1.3% by mass of a saponified ethylene-vinyl acetate copolymer (3-1), 1.3% by mass of a saponified ethylene-vinyl acetate copolymer (3-5), and 0.3% by mass of an ethylene-α-olefin copolymer (4-2)]. Subsequently, these pellets were supplied to the screw type injection molding machine and were subjected to injection molding, to thereby fabricate cylindrical molded products (sliding members) having an inside diameter of 20 mm, an outside diameter of 25.6 mm, and a length of 15 mm.

Example 19

Pellets were fabricated by the component composition and method similar to those of Example 18. 10 parts by mass of these pellets and 4 parts by mass of a lubricant (5-1) were compounded with 100 parts by mass of the polyacetal resin (1) and were mixed by the tumbler mixer to prepare a mixture. This mixture was supplied to the twin-screw vented extruder and melt-kneaded, to thereby form string-like molded products, which were then cut to fabricate pellets [87.7% by mass of polyacetal resin (1), 6.0% by mass of ethylene-propylene-diene rubber (2), 1.25% by mass of a saponified ethylene-vinyl acetate copolymer (3-1), 1.25% by mass of a saponified ethylene-vinyl acetate copolymer (3-5), 0.3% by mass of an ethylene-α-olefin copolymer (4-2), and 3.5% by mass of a lubricant (paraffin oil) (5-1)]. Subsequently, these pellets were supplied to the screw type injection molding machine and were subjected to injection molding, to thereby fabricate cylindrical molded products (sliding members) having an inside diameter of 20 mm, an outside diameter of 25.6 mm, and a length of 15 mm.

Example 20

Pellets were fabricated by the component composition and method similar to those of Example 18. 10 parts by mass of these pellets, 1.5 parts by mass of a lubricant (5-1), and 2.5 parts by mass of a lubricant (5-2) were compounded with 100 parts by mass of the polyacetal resin (1) and were mixed by the tumbler mixer to prepare a mixture. This mixture was supplied to the twin-screw vented extruder and melt-kneaded, to thereby form string-like molded products, which were then cut to fabricate pellets [87.7% by mass of polyacetal resin (1), 6.0% by mass of ethylene-propylene-diene rubber (2), 1.25% by mass of a saponified ethylene-vinyl acetate copolymer (3-1), 1.25% by mass of a saponified ethylene-vinyl acetate copolymer (3-5), 0.3% by mass of an ethylene-α-olefin copolymer (4-2), 1.3% by mass of a lubricant (paraffin oil) (5-1), and 2.2% by mass of a lubricant (synthetic oil) (5-2)]. Subsequently, these pellets were supplied to the screw type injection molding machine and were subjected to injection molding, to thereby fabricate cylindrical molded products (sliding members) having an inside diameter of 20 mm, an outside diameter of 25.6 mm, and a length of 15 mm.

Comparative Example 1

Measurement was made of 45% by mass of ethylene-propylene-diene rubber (2), 45% by mass of an ethylene-vinyl acetate copolymer (6), and 10% by mass of an ethylene-α-olefin copolymer (4-2). These components were mixed by the tumbler mixer to prepare a mixture, and the mixture was supplied to the twin-screw vented extruder and melt-kneaded, to thereby form string-like molded products, which were then cut to fabricate pellets. 5 parts by mass of these pellets were compounded with 100 parts by mass of the polyacetal resin (1) and were mixed by the tumbler mixer to prepare a mixture. This mixture was supplied to the twin-screw vented extruder and melt-kneaded, to thereby form string-like molded products, which were then cut to fabricate pellets [95.2% by mass of polyacetal resin (1), 2.16% by mass of ethylene-propylene-diene rubber (2), 2.16% by mass of an ethylene-vinyl acetate copolymer (6), and 0.48% by mass of an ethylene-α-olefin copolymer (4-2)]. Subsequently, these pellets were supplied to the screw type injection molding machine and were subjected to injection molding, to thereby fabricate cylindrical molded products (sliding members) having an inside diameter of 20 mm, an outside diameter of 25.6 mm, and a length of 15 mm.

Comparative Example 2

Pellets were fabricated by the component composition and method similar to those of Comparative Example 1 described above. 5 parts by mass of these pellets and 3 parts by mass of a lubricant (5-1) were compounded with 100 parts by mass of the polyacetal resin (1) and were mixed by the tumbler mixer to prepare a mixture. This mixture was supplied to the twin-screw vented extruder and melt-kneaded, to thereby form string-like molded products, which were then cut to fabricate pellets [92.6% by mass of polyacetal resin (1), 2.07% by mass of ethylene-propylene-diene rubber (2), 2.07% by mass of an ethylene-vinyl acetate copolymer (6), 0.46% by mass of an ethylene-α-olefin copolymer (C6) (4-2), and 2.8% by mass of a lubricant (paraffin oil) (5-1)]. Subsequently, these pellets were supplied to the screw type injection molding machine and were subjected to injection molding, to thereby fabricate cylindrical molded products (sliding members) having an inside diameter of 20 mm, an outside diameter of 25.6 mm, and a length of 15 mm.

Comparative Example 3

Measurement was made of 6.8% by mass of ethylene-propylene-diene rubber (2), 3.0% by mass of a saponified ethylene-vinyl acetate copolymer (3-1), 0.2% by mass of an ethylene-α-olefin copolymer (C6) (4-2), and the balance consisting of polyacetal resin (1). These components were mixed by the tumbler mixer to prepare a mixture, and the mixture was supplied to the twin-screw vented extruder and melt-kneaded, to thereby form string-like molded products, which were then cut to fabricate pellets. These pellets were supplied to the screw type injection molding machine and were subjected to injection molding, to thereby fabricate cylindrical molded products (sliding members) having an inside diameter of 20 mm, an outside diameter of 25.6 mm, and a length of 15 mm.

The evaluation of the load carrying capacity, creaking sound, and sliding characteristics of the cylindrical molded products (sliding members) consisting of Comparative Examples 1, 2, and 3 was made by a method similar to the above-described evaluation method. The results are shown in Table 6.

TABLE 2

|  | Examples | | | | |
| --- | --- | --- | --- | --- | --- |
|  | 1 | 2 | 3 | 4 | 5 |
| POM (1) | 95 | 92.6 | 90 | 92.6 | 90 |
| EPDM (2) | 3.4 | 5.0 | 6.8 | 5.0 | 6.8 |
| Saponified EVA (3) | | | | | |
| (3-1) | | | | | |
| (3-2) | 1.5 | 2.2 | 3.0 | | |
| (3-3) | | | | 2.2 | 3.0 |
| (3-4) | | | | | |
| (3-5) | | | | | |
| LLDPE (4) | | | | | |
| C4 (4-1) | 0.1 | | | | 0.2 |
| C6 (4-2) | | 0.2 | 0.2 | 0.2 | |
| Lubricant (5) | | | | | |
| Paraffin oil (5-1) | | | | | |
| Synthetic oil (5-2) | | | | | |
| EVA (6) | | | | | |
| Surface pressure on occurrence of creaking sound (kgf/cm$^2$) | 30 | 35 | 35 | 40 | 40 |
| Sliding characteristics | | | | | |
| Limit load (kgf/cm$^2$) | 28 | 30 | 30 | 35 | 35 |
| Coefficient of friction | 0.22 | 0.22 | 0.23 | 0.18 | 0.20 |
| Amount of wear (μm) | 36 | 32 | 28 | 26 | 28 |

TABLE 3

|  | Examples | | | | |
| --- | --- | --- | --- | --- | --- |
|  | 6 | 7 | 8 | 9 | 10 |
| POM (1) | 95 | 90 | 95 | 92.6 | 90 |
| EPDM (2) | 3.4 | 6.8 | 3.4 | 5.0 | 6.8 |
| Saponified EVA (3) | | | | | |

TABLE 3-continued

|  | Examples | | | | |
| --- | --- | --- | --- | --- | --- |
|  | 6 | 7 | 8 | 9 | 10 |
| (3-1) | | | | | |
| (3-2) | | | | | |
| (3-3) | | | | | |
| (3-4) | 1.5 | 3.0 | | | |
| (3-5) | | | 1.5 | 2.2 | 3.0 |
| LLDPE (4) | | | | | |
| C4 (4-1) | 0.1 | | | | |
| C6 (4-2) | | 0.2 | 0.1 | 0.2 | 0.2 |
| Lubricant (5) | | | | | |
| Paraffin oil (5-1) | | | | | |
| Synthetic oil (5-2) | | | | | |
| EVA (6) | | | | | |
| Surface pressure on occurrence of creaking sound (kgf/cm$^2$) | 50 | 50 | 55 | 60 | 60 |
| Sliding characteristics | | | | | |
| Limit load (kgf/cm$^2$) | 45 | 45 | 50 | 55 | 55 |
| Coefficient of friction | 0.16 | 0.14 | 0.12 | 0.11 | 0.11 |
| Amount of wear (μm) | 26 | 24 | 20 | 18 | 16 |

TABLE 4

|  | Examples | | | | |
| --- | --- | --- | --- | --- | --- |
|  | 11 | 12 | 13 | 14 | 15 |
| POM (1) | 92.1 | 89.0 | 94 | 91.1 | 87 |
| EPDM (2) | 5.0 | 6.8 | 3.4 | 5.0 | 6.8 |
| Saponified EVA (3) | | | | | |
| (3-1) | | | | | |
| (3-2) | 2.2 | | | | |
| (3-3) | | 3.0 | | | |
| (3-4) | | | 1.5 | | |
| (3-5) | | | | 2.2 | 3.0 |
| LLDPE (4) | | | | | |
| C4 (4-1) | | 0.2 | | | |
| C6 (4-2) | 0.2 | | 0.1 | 0.2 | 0.2 |
| Lubricant (5) | | | | | |
| Paraffin oil (5-1) | 0.5 | 1.0 | 1.0 | 1.5 | 1.5 |
| Synthetic oil (5-2) | | | | | 1.5 |
| EVA (6) | | | | | |
| Surface pressure on occurrence of creaking sound (kgf/cm$^2$) | 30 | 40 | 55 | 60 | 60 |
| Sliding characteristics | | | | | |
| Limit load (kgf/cm$^2$) | 28 | 35 | 50 | 55 | 55 |
| Coefficient of friction | 0.20 | 0.18 | 0.10 | 0.09 | 0.08 |
| Amount of wear (μm) | 28 | 28 | 20 | 17 | 15 |

TABLE 5

|  | Examples | | | | |
| --- | --- | --- | --- | --- | --- |
|  | 16 | 17 | 18 | 19 | 20 |
| POM (1) | 93.5 | 92.6 | 90.9 | 87.7 | 87.7 |
| EPDM (2) | 4.4 | 4.4 | 6.2 | 6.0 | 6.0 |
| Saponified EVA (3) | | | | | |
| (3-1) | 0.95 | 0.95 | 1.3 | 1.25 | 1.25 |
| (3-2) | | | | | |
| (3-3) | | | | | |
| (3-4) | | | | | |

TABLE 5-continued

| | Examples | | | | |
|---|---|---|---|---|---|
| | 16 | 17 | 18 | 19 | 20 |
| (3-5) LLDPE (4) | 0.95 | 0.95 | 1.3 | 1.25 | 1.25 |
| C4 (4-1) | | | | | |
| C6 (4-2) | 0.2 | 0.2 | 0.3 | 0.3 | 0.3 |
| Lubricant (5) | | | | | |
| Paraffin oil (5-1) | | 0.9 | | 3.5 | 1.3 |
| Synthetic oil (5-2) | | | | | 2.2 |
| EVA (6) | | | | | |
| Surface pressure on occurrence of creaking sound (kgf/cm$^2$) | 40 | 40 | 45 | 45 | 45 |
| Sliding characteristics | | | | | |
| Limit load (kgf/cm$^2$) | 35 | 35 | 40 | 40 | 40 |
| Coefficient of friction | 0.20 | 0.18 | 0.10 | 0.09 | 0.08 |
| Amount of wear (μm) | 28 | 28 | 20 | 17 | 15 |

TABLE 6

| | Comparative Examples | | |
|---|---|---|---|
| | 1 | 2 | 3 |
| POM (1) | 95.2 | 92.6 | 90 |
| EPDM (2) | 2.16 | 2.07 | 6.8 |
| Saponified EVA (3) | | | |
| (3-1) | | | 3.0 |
| (3-2) | | | |
| (3-3) | | | |
| (3-4) | | | |
| (3-5) | | | |
| LLDPE (4) | | | |
| C4 (4-1) | | | |
| C6 (4-2) | 0.48 | 0.46 | 0.2 |
| Lubricant (5) | | | |
| Paraffin oil (5-1) | | 2.8 | |
| Synthetic oil (5-2) | | | |
| EVA (6) | 2.16 | 2.07 | |
| Surface pressure on occurrence of creaking sound (kgf/cm$^2$) | 16 | 16 | 22 |
| Sliding characteristics | | | |
| Limit load (kgf/cm$^2$) | 14 | 14 | 20 |
| Coefficient of friction | 0.33 | 0.28 | 0.25 |
| Amount of wear (μm) | 32 | 30 | 38 |

From the above-described test results, it can be appreciated that, in comparison with the sliding members made from Comparative Examples 1 to 3, in the case of the sliding members obtained by molding the polyacetal resin compositions of Examples 1 to 20, the limit load is remarkably enhanced and the load carrying capacity is substantially improved, and that the occurrence of creaking sound is nil and the sliding characteristics are substantially improved. In particular, the sliding member of Comparative Example 3 contained a saponified ethylene-vinyl acetate copolymer in the component of the polyacetal resin composition, but the degree of saponification was low, and it was not possible to improve the load carrying capacity, the prevention of the creaking sound, and the sliding characteristics. The cause of this difference is unclear but is presumably due to whether or not the saponified ethylene-vinyl acetate copolymer is successfully dispersed and contained in the polyacetal resin. It was confirmed that, in the case of the sliding members obtained by molding the polyacetal resin compositions of Examples 1 to 20, the saponified ethylene-vinyl acetate copolymer was contained finely dispersedly in the polyacetal resin constituting the principal component As described above, according to the polyacetal resin composition and the sliding member in accordance with the present invention, since smooth sliding friction with the mating member is effected, it is possible to provide a polyacetal resin composition and a sliding member which do not generate a creaking sound and are capable of substantially improving load carrying capacity and sliding characteristics including low frictional properties and wear resistance.

The invention claimed is:

1. A polyacetal resin composition comprising: in addition to a polyacetal resin as a principal component,
   1.5 to 7% by mass of an ethylene-propylene-diene rubber;
   0.5 to 3% by mass of a saponified ethylene-vinyl acetate copolymer; and
   0.05 to 0.3% by mass of an ethylene-α-olefin copolymer;
   wherein a proportion of each component is based on 100% by mass of a total of the polyacetal resin, the ethylene-propylene-diene rubber, the saponified ethylene-vinyl acetate copolymer and the ethylene-α-olefin copolymer, and
   wherein the saponified ethylene-vinyl acetate copolymer has a saponification degree of 50 to 100%.

2. The polyacetal resin composition according to claim 1, further comprising: 0.1 to 10% by mass of a lubricant.

3. A sliding member comprising the polyacetal resin composition according to claim 1.

4. The polyacetal resin composition according to claim 1, wherein:
   the ethylene-propylene-diene rubber constitutes 3.4 to 6.8% by mass;
   the saponified ethylene-vinyl acetate copolymer constitutes 1.5 to 3% by mass; and
   the ethylene-α-olefin copolymer constitutes 0.1 to 0.2% by mass.

5. A polyacetal resin composition comprising: in addition to a polyacetal resin as a principal component, the composition further comprising:
   3.4 to 6.8% by mass of an ethylene-propylene-diene rubber;
   1.5 to 3% by mass of a saponified ethylene-vinyl acetate copolymer; and
   0.1 to 0.2% by mass of an ethylene-α-olefin copolymer;
   wherein a total content of said polyacetal resin, said ethylene-propylene-diene, said saponified ethylene-vinyl acetate copolymer and said ethylene-α-olefin copolymer is based on 100% by weight of the composition.

* * * * *